(12) United States Patent
Cline et al.

(10) Patent No.: US 8,740,070 B2
(45) Date of Patent: *Jun. 3, 2014

(54) SYSTEM AND METHOD FOR OFFERING AND MANAGING ONLINE PURCHASING CARD TRANSACTIONS

(75) Inventors: Andrea Cline, San Marcos, CA (US); Marilyn Parks, Oakton, VA (US); Johannes Weigand, Oceanside, CA (US); Abram Lietz, San Marcos, CA (US); Yolette Hunt, Niagra Falls, NY (US); Brendan Fogarty, San Marcos, CA (US)

(73) Assignee: Life Technologies Corporation, Carlsbad, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 12/775,428

(22) Filed: May 6, 2010

(65) Prior Publication Data

US 2011/0087562 A1    Apr. 14, 2011

Related U.S. Application Data

(63) Continuation of application No. 11/322,627, filed on Dec. 30, 2005, now Pat. No. 7,757,944.

(60) Provisional application No. 60/640,307, filed on Dec. 30, 2004.

(51) Int. Cl.
*G06K 15/00* (2006.01)
*G06F 17/00* (2006.01)
*G06F 7/08* (2006.01)
*G06Q 20/00* (2012.01)
*G06Q 40/00* (2012.01)

(52) U.S. Cl.
USPC ............ 235/383; 235/375; 235/381; 705/16; 705/39; 705/64; 705/66

(58) Field of Classification Search
USPC ........ 235/375, 380, 381, 383; 705/16, 17, 26, 705/39, 64–66, 26.1
See application file for complete search history.

(56) References Cited

U.S. PATENT DOCUMENTS

| | | | |
|---|---|---|---|
| 7,174,316 B2 * | 2/2007 | Phillips et al. | 705/41 |
| 7,243,076 B1 * | 7/2007 | Cardenas | 705/27.1 |
| 7,757,944 B2 * | 7/2010 | Cline et al. | 235/383 |
| 2002/0138425 A1 * | 9/2002 | Shimizu et al. | 705/40 |
| 2003/0033246 A1 * | 2/2003 | Slater | 705/39 |
| 2004/0205138 A1 * | 10/2004 | Friedman et al. | 709/206 |
| 2005/0199712 A1 * | 9/2005 | Rosenblatt | 235/381 |
| 2006/0078100 A1 * | 4/2006 | Risafi et al. | 379/114.2 |
| 2007/0203788 A1 * | 8/2007 | Andalib et al. | 705/14 |

* cited by examiner

*Primary Examiner* — Thien M Le
*Assistant Examiner* — April Taylor

(57) ABSTRACT

A purchase card system configured in accordance with the invention offers purchase card products that facilitate online purchases of life sciences research products and/or services via an e-commerce application. The acquisition and use of such purchase card products complies with mandated procurement, spending, and appropriations rules, regulations, and laws, such as the Federal Acquisition Regulation, the Anti-Deficiency Act, and the Department of Defense "bona fide needs" rule.

26 Claims, 12 Drawing Sheets

FIG. 9

SYSTEM AND METHOD FOR OFFERING AND MANAGING ONLINE PURCHASING CARD TRANSACTIONS

CROSS-REFERENCE TO RELATED APPLICATION

This application claims the benefit of U.S. patent application Ser. No. 11/322,627, filed Dec. 30, 2005 which claims the benefit of U.S. provisional patent application Ser. No. 60/640,307, filed Dec. 30, 2004 (the entire contents of each which are incorporated by reference herein).

TECHNICAL FIELD

The present invention relates generally to online purchasing and e-commerce systems. More particularly, the present invention relates to an online purchasing card program that can be used by government and academic customers who must abide by strict procurement, purchasing, and acquisition rules, laws, or regulations. The card has been designed for use by all customers, but many of the features lend added value to the U.S. Government buyer.

BACKGROUND

The prior art is replete with "prepaid" or "gift" cards that can be used by customers of retail and service establishments as a form of payment in lieu of cash or credit card transactions. For example, many department stores, restaurants, and coffee shops offer prepaid cards to their customers. Historically, prepaid or gift cards have not been made available for certain types of goods and products, such as life science research products, biological reagents, laboratory specimens, and the like, particularly when a significant number of the purchasers of such products are government purchasers, academic purchasers, or other persons or entities that are governed by certain procurement, appropriations, and spending rules and regulations. For example, government purchasers may be restricted by regulations and laws (such as the Federal Acquisition Regulation, the Anti-Deficiency Act, or the "bona fide needs" rule), which may prohibit the spending of government funds in advance, require competitive bidding for purchases that exceed a specified amount, or mandate "fair and reasonable" pricing for all purchases.

Most government purchasing departments charge their end users an administrative fee to buy products on behalf of the government. The administrative fee for a given purchase can represent a significant expenditure of funds that could otherwise be spent on additional product. Unfortunately, these administrative fees are assessed for each new purchase made by such end users.

Furthermore, the market for life science research products and services is becoming increasingly competitive, particularly for "commodity" products such as oligonucleotides. In this regard, traditional purchasing models (including typical e-commerce models) may not sufficiently streamline the product purchasing routine for customers, provide a means to fully utilize available funding, encourage purchasers to use online ordering, foster brand loyalty, or establish long term purchase commitments.

Accordingly, it is desirable to have a purchase card system for government and academic purchasers, where the system is in compliance with mandated procurement, spending, and appropriations rules, regulations, and laws. In addition, it is desirable to have a purchase card system for life sciences research products and services that provides a legal and ethical means to avoid excessive administrative fees associated with the purchase of certain products. Furthermore, other desirable features and characteristics of the present invention will become apparent from the subsequent detailed description and the appended claims, taken in conjunction with the accompanying drawings and the foregoing technical field and background.

BRIEF SUMMARY

A purchase card system for life sciences research products and services is provided in a manner that fully complies with certain government rules and regulations related to appropriations. Certain features and characteristics of the purchase card system are specifically designed to address legal and ethical issues surrounding the expenditure of government funds. Therefore, a government or academic purchaser can acquire and use a purchase card product offered by the system while satisfying mandated procurement, spending, and appropriations rules and regulations.

The above and other aspects of the invention may be carried out in one form by a method for facilitating purchase card product transactions for a user account, especially a government or academic user in compliance with procurement, spending, and appropriations rules, regulations, and laws that are applicable to the user account, especially mandated rules, regulations, and laws. The method involves receiving, via an e-commerce transaction, a request for a purchase card product having a stated value, the purchase card product having a product identifier, such as a SKU and/or a catalog identifier associated therewith, electronically processing credit card information, purchase order information, or a combination thereof, as a method of payment for the purchase card product, and establishing a purchase card balance for the user account in the amount of the stated value.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

FIG. 9 is a screen capture of an example checkout web page that may be generated by a purchase card system according to the invention;

DETAILED DESCRIPTION

The following detailed description is merely illustrative in nature and is not intended to limit the invention or the application and uses of the invention. Furthermore, there is no intention to be bound by any expressed or implied theory presented in the preceding technical field, background, brief summary or the following detailed description.

The invention may be described herein in terms of functional and/or logical block components and various processing steps. It should be appreciated that such block components may be realized by any number of hardware, software, and/or firmware components configured to perform the specified functions. For example, an embodiment of the invention may employ various computer hardware or integrated circuit components, e.g., server architectures, data communication elements, memory elements, logic elements, look-up tables, or the like, which may carry out a variety of functions under the control of one or more microprocessors or other control devices. In addition, those skilled in the art will appreciate that the present invention may be practiced in conjunction with any number of data transmission protocols, network architectures, and e-commerce applications, and that the system described herein is merely one exemplary application for the invention.

For the sake of brevity, conventional techniques related to e-commerce applications, email systems, Internet data communication protocols and technologies, signaling, network control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

Figure 1:
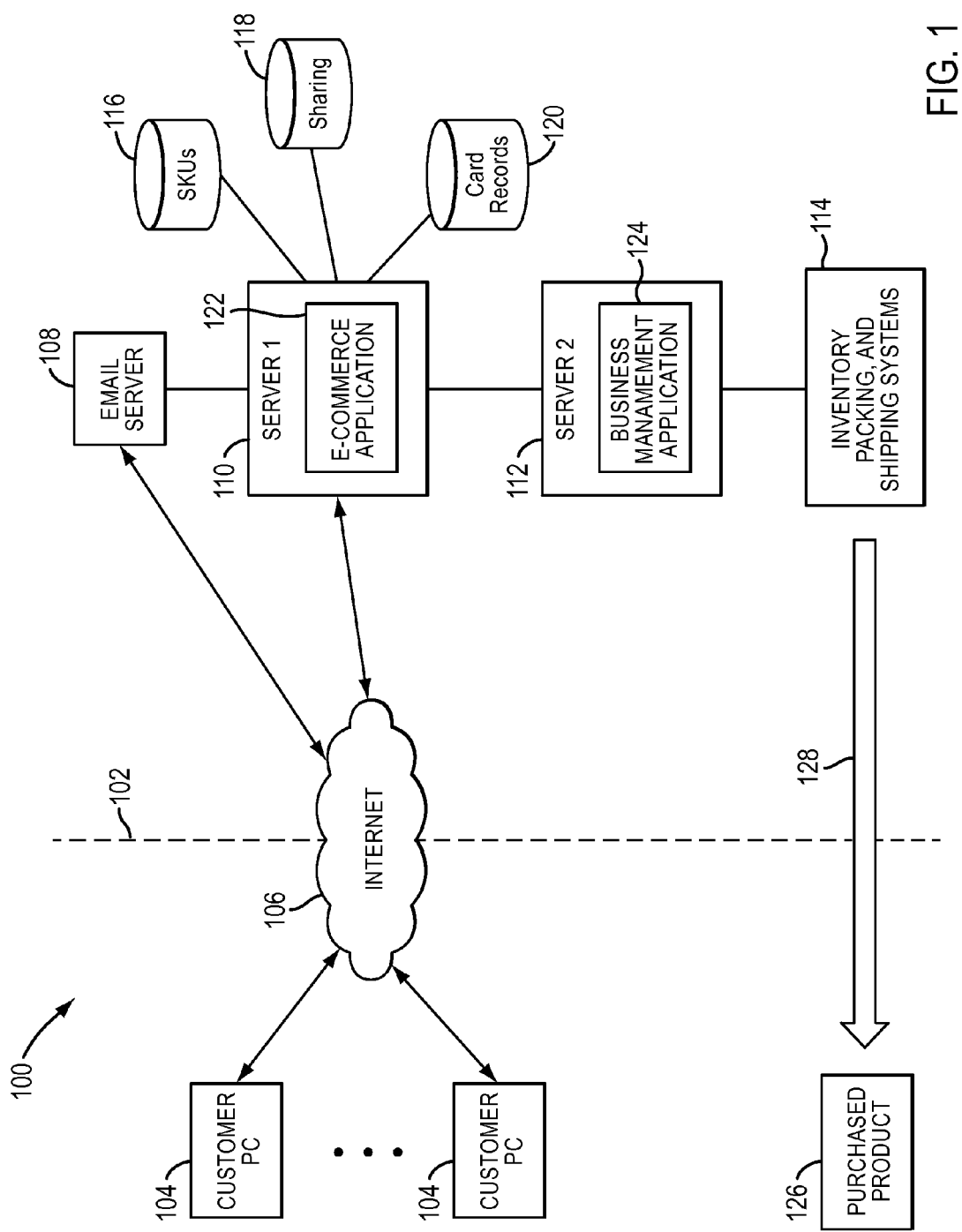
FIG. 1 is a schematic representation of a purchase card system configured in accordance with an example embodiment of the invention.

The following description refers to components or features being "connected" or "coupled" together. As used herein, unless expressly stated otherwise, "connected" means that one component/feature is directly or indirectly connected to another component/feature, and not necessarily mechanically. Likewise, unless expressly stated otherwise, "coupled" means that one component/feature is directly or indirectly coupled to another component/feature, and not necessarily mechanically. Thus, although the schematic shown in FIG. 1 depicts one example arrangement of elements, additional intervening elements, devices, features, or components may be present in an actual embodiment (assuming that the functionality of the overall system is not adversely affected).

The invention can be deployed in the context of an e-commerce system maintained by an entity that offers goods and/or services via online purchasing. The invention is suitable for use in connection with the online offering of life sciences research products and services, such as those available for purchase on the worldwide web at invitrogen.com (incorporated by reference in its entirety). Life sciences research products and services include, without limitation: antibodies; clone collections; cloning tools and technologies; electrophoresis products, such as gels; enzymes; laboratory services; gene expression tools and technologies; genome analysis tools and technologies; bioinformatics software; drug discovery tools and technologies; molecular probes; PCR and RT-PCR tools and technologies; protein interaction products; purification products; RNAi products; sequencing products; transfection and molecular transfer products, such as reagents; transformation products; reagents; proteomics tools and technologies; cell culture products; and primers. These and other life sciences research products and services are available from Invitrogen Corporation. Briefly, an e-commerce system configured in accordance with the invention is suitably configured to offer purchase card products to online customers, where such purchase cards can be used as a method of payment for life sciences research products and/or services offered by a manufacturer or reseller of such life sciences research and/or services products.

As used herein, the term "customer" refers to any individual, institution, corporation, university, business entity, academic entity, or organization seeking to obtain products and/or services, such as life sciences research products and/or services.

As used herein, the term "provider" refers to any individual, institution, corporation, university, business entity, academic entity, or organization seeking to provide products and/or services, such as life sciences research products and/or services. A provider can be, for example, a manufacturer, retailer, reseller, distributor, or vendor.

FIG. 1 is a schematic representation of a purchase card system 100 configured in accordance with an example embodiment of the invention. In the preferred embodiment, purchase card system 100 is deployed in the context of an online e-commerce system, where any number of remote users can purchase products via a web site maintained by a business entity. In this regard, FIG. 1 depicts an imaginary line 102 that generally divides purchase card system 100 into two sections. The section to the right of line 102 includes physical and logical components or features that are maintained, owned, controlled, and/or operated by the business entity, while the section to the left of line 102 represents physical and logical components or features corresponding to a customer site, location, or facility.

Purchase card system 100 generally includes one or more customer computer devices 104 (such as personal computers), each of which is connected to a data communication network (such as the Internet 106 in this example) to facilitate online transactions as described herein. Purchase card system 100 may also include a number of business entity components, including, without limitation: an email server 108; an e-commerce server 110; a business management server 112; and various inventory, packing, and shipping systems 114, which may include any number of additional servers, computer devices, or related equipment. In this example, email server 108 and e-commerce server 110 are each connected to the Internet 106 to facilitate bi-directional communication with customer computer devices 104. Purchase card system 100 may further include a number of business entity databases, including, without limitation: a product catalog identifier database (depicted as an SKU database 116); a purchase card balance sharing database 118; and a purchase card record database 120. For purposes of this example only, these databases are coupled to e-commerce server 110. It should be appreciated that a practical system may employ a different database and server architecture than that shown in FIG. 1.

In FIG. 1, customer computer devices 104, email server 108, e-commerce server 110, business management server 112, and possibly certain aspects of inventory, packing, and shipping systems 114 represent physical hardware components, virtual machines, or logical components. Any given server may be a computing device or a computer system configured to perform the respective server application tasks described herein (and possibly other tasks), while customer computer devices 104 may be personal computers configured to perform tasks associated with conventional end user applications, such as web browser applications. In a practical deployment, the business entity components may communicate with one another via a suitably configured network architecture.

A "server" is often defined as a computing device or system configured to perform any number of functions and operations associated with the management, processing, storage, retrieval, and/or delivery of data, particularly in a network environment. Alternatively, a "server" or "server application" may refer to software that performs such processes, methods, and/or techniques. In practical applications, a server component that supports purchase card system 100 may be configured in accordance with any known computer platform, e.g., Compaq Alpha Tru64, FreeBSD, HP-UX, IBM AIX, Linux, NCR MP-RAS, SCO OpenServer, SCO Unixware, SGI Irix, Solaris (Sparc), Solaris (Intel), Windows 2000, Windows NT, or Novell Netware. As in most commercially available general purpose servers, a practical server component that supports purchase card system 100 may be configured to run on any suitable operating system such as Unix, Linux, the Apple Macintosh OS, or any variant of Microsoft Windows, and it may employ any number of microprocessor devices, e.g., the Pentium family of processors by Intel or the processor devices commercially available from Advanced Micro Devices, IBM, Sun Microsystems, or Motorola.

With regard to customer computer devices 104 and the various servers described herein, the respective processors communicate with system memory (e.g., a suitable amount of random access memory), and an appropriate amount of storage or "permanent" memory. The permanent memory may include one or more hard disks, floppy disks, CD-ROM, DVD-ROM, magnetic tape, removable media, solid state memory devices, or combinations thereof. In accordance with known techniques, the operating system programs and the server application programs reside in the permanent memory and portions thereof may be loaded into the system memory during operation. In accordance with the practices of persons skilled in the art of computer programming, the present invention is described herein with reference to symbolic representations of operations that may be performed by the various server components or the client components. Such operations are sometimes referred to as being computer-executed, computerized, software-implemented, or computer-implemented. It will be appreciated that operations that are symbolically represented include the manipulation by the various microprocessor devices of electrical signals representing data bits at memory locations in the system memory, as well as other processing of signals. The memory locations where data bits are maintained are physical locations that have particular electrical, magnetic, optical, or organic properties corresponding to the data bits.

When implemented in software, various elements of the present invention (which may reside at the client computer devices 104, or at one or more of the business entity components, particularly the servers) are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

E-commerce server 110 includes an e-commerce application 122, which represents the main processing engine for purchase card system 100. Generally, the e-commerce engine is configured to generate web pages to facilitate online purchases of life sciences research and services products for user accounts, and to facilitate online purchases of purchase card products for user accounts. E-commerce application 122 is suitably configured to generate an e-commerce web site for the business entity, where the e-commerce web site may include any number of web pages designed to support traditional e-commerce functionality and additional functionality described herein. In this regard, e-commerce application 122 may generate and transmit web pages, via the Internet 106, to conventional web browser applications running on customer computer devices 104. These web pages preferably enable an online customer to browse the online product catalog of the business entity, create an online account profile, select products for purchase, complete online purchase transactions, view order history, and perform other tasks normally associated with online e-commerce applications. In accordance with the preferred embodiment of the invention, e-commerce application 122 also generates web pages that enable an online customer to buy purchase card products, and to apply a purchase card balance as a method of payment toward subsequent online product purchases. As described in more detail below, e-commerce application 122 may also be configured to generate web pages that support other features of purchase card system 100, such as purchase card balance replenishment and purchase card balance sharing.

SKU database 116 includes product catalog identifiers (typically a series of alphanumeric characters) that uniquely identify all of the products available through e-commerce application 122 (and possibly other products that are only available through traditional ordering routes). Notably, SKU database 116 also includes product catalog identifiers corresponding to purchase card products available through e-commerce application 122. In the example embodiment of the invention, purchase card products having different initial values are offered to online customers, and each of the different initial values is identified by a unique product catalog identifier. For example, purchase card products having initial values of $500, $750, $1000, $1500, $2000, and $2500 would be identified by six different product catalog identifiers. In addition, e-commerce application 122 is preferably configured to offer different replenishment amounts for active purchase card products, and each replenishment value is identified by a unique product catalog identifier. In accordance with one practical embodiment, replenishment values of $500, $750, $1000, $1500, $2000, and $2500 would be identified by the same product catalog identifiers utilized for initial card purchases. In an alternate embodiment, replenishment values of $500, $750, $1000, $1500, $2000, and $2500 would be identified by six different product catalog identifiers (resulting in a total of 12 different product catalog identifiers associated with purchase card products). It will be understood that the purchase cards are used to purchase products that cost up to the value of a purchase card, or to be applied toward the purchase of a product that costs more than the value of a purchase card. In certain exemplary methods, the purchase cards are used to purchase products whose value is equal to or less than one-half, one-third, one-fourth, one-fifth, one-tenth, or one-twentieth of the value of the purchase card. In certain exemplary embodiments, at least 2, 3, 4, 5, 6, 7, 8, 9, 10, 15, 20, 25, 30, 35, 40, 45, 50, 75, or 100 transactions are processed using a single purchase card.

Purchase card balance sharing database 118 includes information associated with the sharing of purchase card balances maintained by purchase card system 100. As described in more detail below, the initial purchaser of a purchase card product is considered the primary user of that purchase card product. In accordance with one practical embodiment of the invention, the primary user can share the purchase card balance with one or more secondary users. In this regard, purchase card balance sharing database 118 may store information that links primary users to secondary users, secondary user purchase information accessible by the primary users, data related to the establishment and activation of account sharing, and the like.

Card record database 120 includes data for purchase card products that have active (and possibly inactive) balances. For example, in a practical deployment of purchase card system 100, each purchase card product may be assigned a unique card number upon activation, and each card number may have an associated card record maintained in card record database 120. A card record may contain any number of data fields, including, without limitation: the card number; the date of initial purchase; the name of the purchaser; the username and password of the purchaser; the initial balance; the current balance; a historical record of prior products and/or services purchased; the date of any replenishment purchases; a nickname for the card; a funding source identifier for the card; or the like. One or more of these fields may be updated to reflect transactions made with the purchase card product.

Email server 108 may operate in a conventional manner to receive, transmit, and process email for purchase card system 100. For example, email server 108 may be employed to send purchase confirmation emails to customers, to receive inquiries form customers, or to facilitate activation of user accounts or account features for purchase card system 100. Thus, email server 108 may be coupled to e-commerce server 110 and to the Internet 106 to facilitate email transmission with online customers. It should be appreciated that the operating details of email systems are known to those skilled in the art and, therefore, will not be addressed herein.

Business management server 112 includes a business management application 124, which is suitably configured to perform a number of functions in support of purchase card system 100 and e-commerce application 122. For example, business management application 124 may perform or facilitate any of the following functions, without limitation: order processing; accounting; and creation and maintenance of deferred revenue accounts. Furthermore, business management server 112 may communicate with one or more of the inventory, packing, and shipping systems 114 to monitor, control, or initiate the updating of inventory databases, the packing of purchased product, and the shipping of purchased product to the intended recipients. In the example embodiment, the business entity maintains an inventory system for life sciences research products and services and purchase card products available for purchase via e-commerce application 122. FIG. 1 depicts purchased product 126 being transferred from the custody of the business entity to the customer via a suitable shipping mechanism 128. Notably, purchased product 126 may represent a tangible purchase card product that is shipped to the primary user (e.g., the initial purchaser) and otherwise treated like any other product in the inventory.

Purchase Card Product Features

As alluded to above, purchase card system 100, in certain illustrative embodiments, is designed to offer purchase card products suitable for use by purchasers of life sciences research products and services that may be funded by research grants or other subsidized funding sources, such as government, academic, and certain corporate organizations. Purchase card system 100 is designed to offer such purchase card products for sale, to establish and maintain purchase card balances in connection with online user account profiles, process e-commerce transactions for online purchases made with purchase card balances, and offer other features that comply with applicable procurement, spending, and appropriations rules, regulations, and laws, and restrictions. The following is a summary of several features and functions of purchase card system 100 and/or purchase card products handled by purchase card system 100.

Product SKU—In illustrative embodiments of the invention, a purchase card product according to the invention is offered, marketed, and otherwise treated like any other tangible product by the offering business entity. In this regard, the purchase card product includes a product catalog identifier, e.g., an SKU number, associated therewith. As mentioned above, purchase card products having different initial values (e.g., $500, $750, $1000, $1500, $2000, and $2500) are identified with different unique SKUs. Different replenishment values for existing purchase card products are identified with the same set of SKUs. Thus, purchase card system 100 and the related business entity can process sales of purchase card products and replenishments in the same manner as any other product. Furthermore, this feature is particularly important to enable purchase card system 100 to satisfy a number of regulatory requirements imposed upon U.S. government procurements. For example, purchase cards products are sold as "commercial" items as defined by the Federal Acquisition Regulation ("FAR"), Part 12. As a result, the standard terms and conditions of any government acquisition for the purchase of a commercial item apply to the sale of such purchase cards.

Shipping of Purchase Card Product—In certain embodiments, purchase card products according to the present invention are "virtual" in that there is no physical product that corresponds to the purchase card product. Rather, a unique identifier, which is distinct from the product SKU number, can be used, for example, to identify the purchase card product, without the need for shipping a physical product. Accordingly, a unique identifier number can be electronically delivered to a user or purchaser of the purchase card. In certain illustrative embodiments, however, purchase card products according to the invention are shipped to the customer as a tangible product. Purchase card system 100 may utilize inventory, packing, and shipping systems 114 to facilitate shipping of the purchase card products. In one practical embodiment of the invention, purchase card products are sized to resemble a credit card, but they have no functional features or electromagnetic characteristics (in some embodiments, a purchase card product might include imprinted instructions for use, an imprinted card number, an imprinted account number, an imprinted user name, or the like). Purchase card products are preferably shipped with a printed reconciliation document to facilitate procurement system intake procedures by the purchasing customer or the purchasing business entity. The reconciliation document allows the purchasing entity to receive the purchase card products into its standard procurement system. In practice, the reconciliation document may be an invoice, a packing slip, a purchase order confirmation, or the like. These features are particularly important for government buyers who, in order to meet certain government requirements, must receive a deliverable product in exchange for the government expenditure.

Online Transactions—In accordance with the exemplary embodiment of the invention, the business entity only offers purchase card products online via e-commerce application 122, and restricts subsequent purchases made with purchase card balances to online purchases via e-commerce application 122. Thus, in the preferred embodiment, purchase card system 100 will not accept a purchase card balance as a method of payment for telephone, facsimile, email, or written orders. These restrictions encourage customers to use e-commerce application 122 for product purchases, which can lead to increased revenue for the business entity, streamlined order processing, recapturing of market share for low-margin products, enhanced customer loyalty, and other benefits for both the business entity and the customers.

Unrestricted Access—In illustrative embodiments, purchase card system 100 generally allows purchase card product holders to apply their purchase card balances toward any product or product line that would otherwise be available via e-commerce application 122. In other words, a purchase card balance need not be restricted to any particular product, product line, or product type. In addition, a purchase card balance may be accessible 24 hours a day, thus enabling product purchases at the convenience of the customer. Furthermore, the e-commerce nature of purchases using the purchase card provides real-time access to purchase card balance information and real-time approval or rejection of a purchase using a purchase card. Accordingly, in illustrative embodiments the purchase card balance is maintained in real time and is accessible in real-time by purchase card product holders. Therefore, in illustrative embodiments there is no delay in the processing of a purchase under a purchase card and updating of a balance of the purchase card, other than the time required to process an e-commerce transaction. Accordingly, where multiple users share a purchase card account, each of the users can access the current purchase card balance, regardless of whether another user made a purchase under the purchase card recently, for example within the previous 24, 12, 10, 9, 8, 7, 6, 5, 4, 3, 2, 1, 0.5, 0.4, 0.3, 0.25, 0.2, or 0.1 hours, or within the previous 60, 50, 40, 30, 20, 15, 10, 5, 4, 2, 3, or 1 minutes. Of course, depending upon the particular customer or customer entity, product offerings might be limited or restricted by agreement. For example, NIH product offerings may be limited to only those items that are approved for sale under an NIH Blanket Purchase Agreement. In certain embodiments, the purchase card balance is used to purchase life sciences research products and services other than, or in addition to, oligonucleotides and/or their synthesis.

Online Management—The primary holder of a purchase card product can manage purchase card balance(s) using an online account profile. For example, e-commerce application 122 may be suitably configured to generate a summary web page that identifies each purchase card number and its corresponding balance, and provides cardholder access to order and transaction history for each active purchase card product (and possibly inactive purchase card products). In addition, purchase card system 100 may allow the cardholder to identify purchase card balances using nicknames, government funding source identifiers, grant numbers, contract numbers, or the like. This feature is desirable to enable the cardholder to quickly identify the source of funds corresponding to a given purchase card balance, thus preventing misapplication of funds. Indeed, purchase card system 100 may be suitably configured to allow the purchaser to earmark the source of purchase card balance funds and to automatically prevent cross-use of funds.

Security and Prevention of Misuse of Funds—In the practical embodiment of the invention, as an added security measure, purchase card products are not shipped with their card numbers. In addition, a given card number is linked to the customer's online account profile, which can only be accessed via a secure online login procedure (using, e.g., a unique combination of a username and a password for the online account). Thus, the mere knowledge of a purchase card number is insufficient to gain access to the online account and, therefore, insufficient to obtain purchasing power. In practice, the purchase card records can be centrally stored and controlled by the business entity using any number of physical and electronic security systems for protection. These security features are particularly important to satisfy government concerns related to the proper use of government funds and the prevention of misuse of government funds.

Micro-Purchase Qualification—In accordance with the example embodiment of the invention, the maximum initial value for new purchase card products and the maximum replenish value for existing purchase card balances qualifies as a "micro-purchase" as defined by the Federal Acquisition Regulation ("FAR"). Currently, the micro-purchase threshold is $2500. Briefly, purchases that are less than or equal to the micro-purchase threshold may be transacted using the simplified acquisition procedures set forth in FAR Subpart 13.3, namely, the purchaser need not obtain competitive bids from multiple vendors for the product. In practice, the authority to make micro-purchases is frequently delegated to non-procurement personnel of a government agency or organization, thus facilitating more efficient and streamlined use of purchase card system 100. Therefore, setting an upper limit on purchase card product values is particularly important for government buyers who must comply with FAR. In a practical embodiment, the total running balance of a given purchase card product may include any number of replenishment purchases, and the total running balance need not be limited.

Purchase Card Balance Sharing—A customer or a customer entity may want to provide shared purchasing power for a purchase card product. Accordingly, purchase card system 100 is preferably configured to facilitate sharing of card balances. In this regard, purchase card system 100 allows the primary cardholder to control shared access rights to a purchase card balance such that other people having an online account profile with the offering business entity can use the same purchase card balance for product purchases. In accordance with one practical embodiment of the invention, purchase card system 100 restricts the shared users (referred to herein as secondary users or secondary cardholders) such that shared users can only spend the purchase card funds. In other words, purchase card system 100 does not allow secondary users to replenish purchase card balances or establish further sharing rights with other persons.

Maximizing Fiscal Year Budgets—Purchase card system 100 allows a customer to utilize existing budget funds and maximize the use of such funds. Otherwise, funds allocated for a current budget might be lost. For example, a customer can acquire a purchase card product using funds from the current fiscal year, then use the purchase card balance on product purchased in the next fiscal year.

Reduction in Administrative Purchase Fees—Certain purchasers, especially purchasers at large institutions, such as those with separate accounting departments, for example, government purchasers, certain academic purchasers, and certain corporate purchasers, may be assessed an administrative fee for product purchases made with a purchase order or a record of call. Such administrative fees are levied by the respective government agency or organization, and such administrative fees do not appear on the invoice from the business entity that actually supplies the product. Typically, each separate purchase order or record of call triggers the administrative fee process. Purchase card system 100 is suitably configured to avoid administrative fees payable by a cardholder because only one single purchase order or record of call need be completed for a given purchase card product. Subsequent product purchases using the purchase card balance as a method of payment can be completed without a new purchase order or a new record of call. Furthermore, purchase card balance replenishments can be treated as a modification to an existing purchase order or record of call (in lieu of a new purchase order or record of call), thus avoiding administrative fees for replenishments. To further reduce the impact of administrative fees, e-commerce application 122 may be configured to recommend a credit card as the method of payment for purchase card products. Notably, the customer or the customer entity would be responsible for properly handling and characterizing the procurement of purchase card products and replenishments.

Limited Purchase Card Lifespan—In accordance with one practical embodiment of the invention, a purchase card balance remains active for a limited time, e.g., two years from the date of purchase. Upon deactivation of a purchase card balance, purchase card system 100 may attempt to contact the primary user, the respective business entity, or the respective government organization or agency to determine how best to process the unused funds. For example, purchase card system 100 may initiate a balance refund procedure to avoid misuse or loss of government funds.

Refundable Purchase Card Balance—In accordance with the example embodiment of the invention, government purchasers may redeem a purchase card balance for a refund at any time. Although the offering business entity need not be obligated to return all of the unused funds at the end of the fiscal year, it is desirable (from a federal appropriations standpoint) to make unused purchase card balances readily available for refunds upon request from government cardholders. Refunds are processed in the manner in which the purchase card balance was procured. For example, if a credit card was used to acquire the purchase card product, then a credit to the credit card account will be issued. If a purchase order or record of call was used to acquire the purchase card product, then the appropriate agency appropriation account will issued the refund. In practice, the purchase card product itself and/or the paperwork accompanying the delivery of the purchase card product may contain a written statement that confirms the redeemable nature of the purchase card balance for government buyers. This feature is particularly important for government buyers, who might otherwise be restricted from using nonrefundable purchase card products. More specifically, this feature is desirable to facilitate government compliance with the Anti-Deficiency Act.

"Fair and Reasonable" Pricing—The Anti-Deficiency Act mandates that government buyers are expected to only buy products that are fair and reasonably priced. The establishment of SKU numbers, and automatically defaulting the customer to their lowest available price satisfies the "fair and reasonable" requirement. In this regard, purchase card system 100 directly links the use of purchase card products to deliverable products that are identified by SKU numbers and fair and reasonable list prices.

EXAMPLE PURCHASE CARD PRODUCT TRANSACTIONS

The following is a description of typical purchase card procurement and usage scenarios supported by purchase card system 100. The following description is not intended to be exhaustive of all possible processing options and those skilled in the art will appreciate that many additional and/or alternative features, options, and protocols may be utilized in a practical deployment of purchase card system 100.

Figure 2:
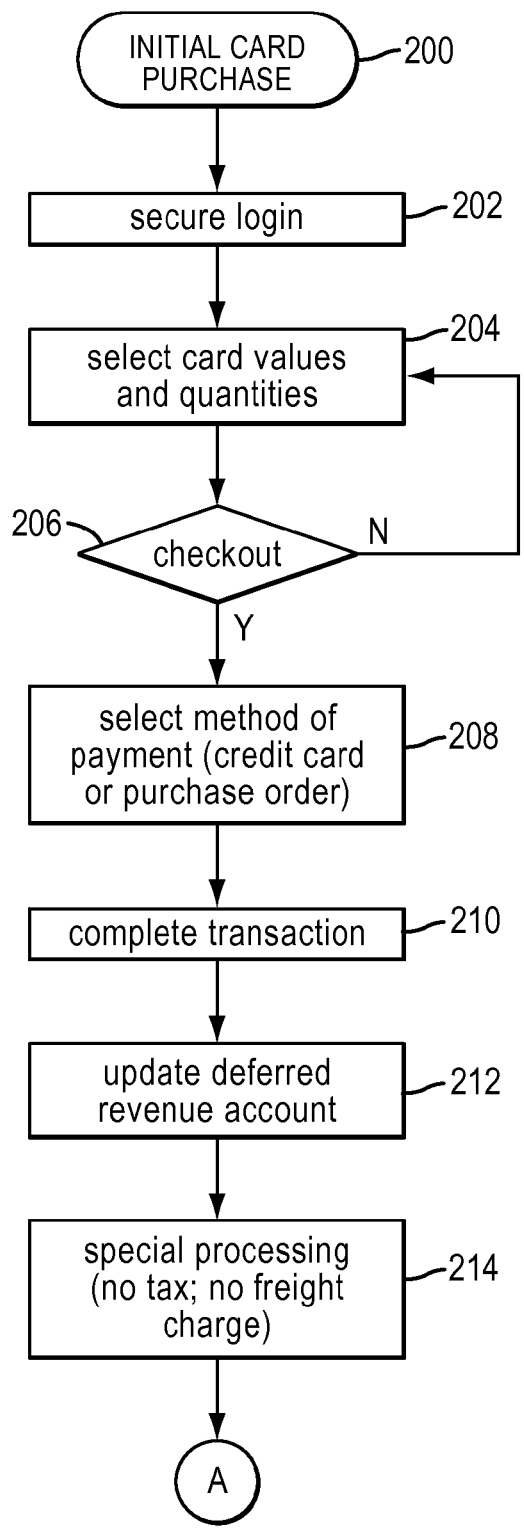
FIGS. 2 and 3 are a flow diagram of an initial card purchase process according to an example embodiment of the invention.
Figure 3:
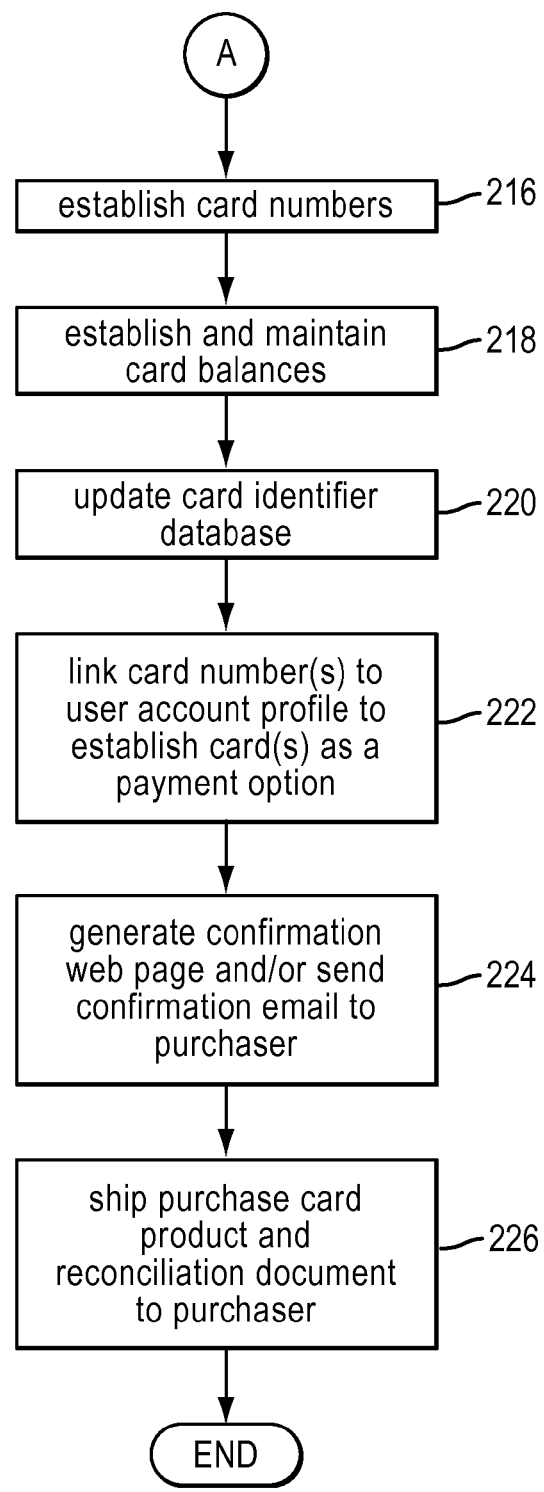

Initial Card Purchase—FIGS. 2 and 3 contain a flow diagram of an initial card purchase process 200 according to an example embodiment of the invention. Process 200 assumes that the purchaser (referred to herein as the primary user) has already established an online profile and e-commerce account with the business entity offering the purchase card products. The various tasks performed in connection with process 200 may be performed by software, hardware, firmware, or any combination thereof. For illustrative purposes, the following description of process 200 may refer to elements mentioned above in connection with FIG. 1. In practical embodiments, portions of process 200 may be performed by different elements of purchase card system 100, e.g., customer computer devices 104 or any of the business entity components. It should be appreciated that process 200 may include any number of additional or alternative tasks, the tasks shown in FIGS. 2 and 3 need not be performed in the illustrated order, and process 200 may be incorporated into a more comprehensive procedure or process having additional functionality not described in detail herein.

Figure 4:
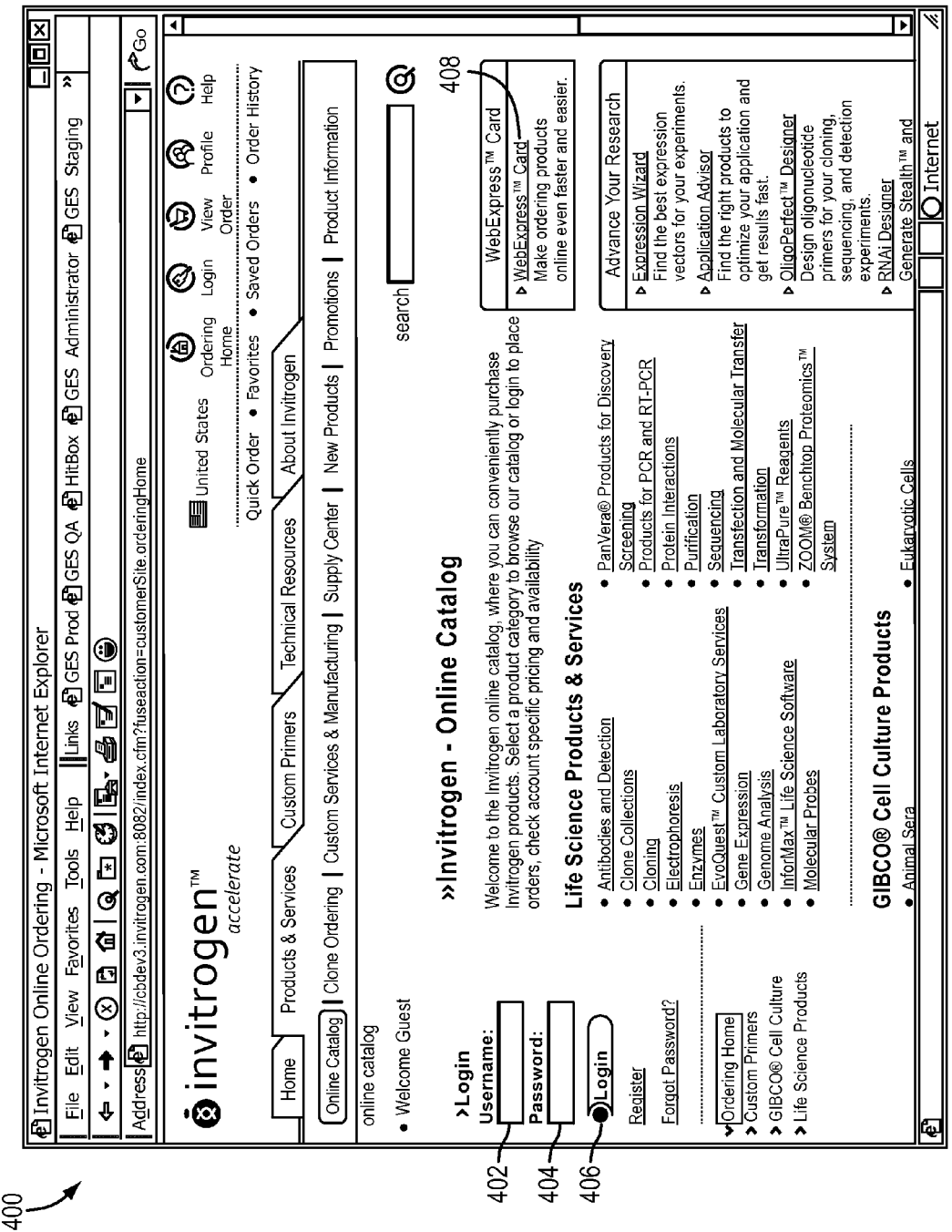
FIG. 4 is a screen capture of an example web page that may be generated by a purchase card system according to the invention.

Initial card purchase process 200 may begin by performing a secure login procedure (task 202) to access the customer's online account or profile. In a practical embodiment, e-commerce application 122 may generate a suitable web page that allows the customer to enter login data at customer computer device 104. In this regard, FIG. 4 is a screen capture of an example web page 400 that may be generated by purchase card system 100 to facilitate task 202. As shown, web page 400 preferably includes a username data entry field 402 and a password data entry field 404 for receiving the respective information from the customer. In accordance with known authentication techniques, web page 400 includes a "login" button or link 406 that functions to transmit the login data to e-commerce application 122 for processing.

Figure 5:
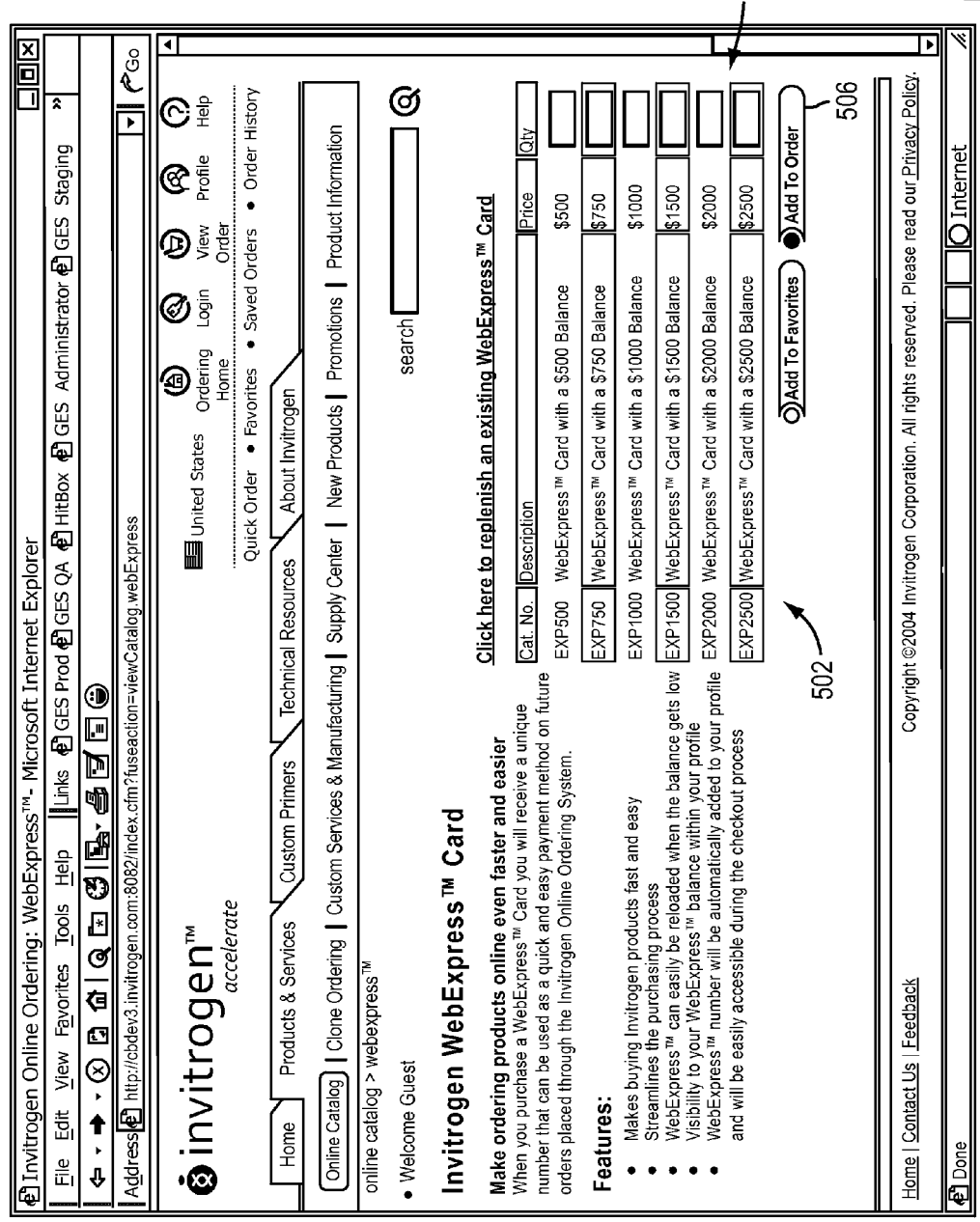
FIG. 5 is a screen capture of an example purchase card ordering web page that may be generated by a purchase card system according to the invention.

Assuming that the login is successful, the customer can access a purchase card product web page via a suitable link 408, which may be rendered on web page 400 or on another web page generated by e-commerce application 122 in response to task 202. Activation of link 408 may prompt the display of another web page that facilitates the ordering of one or more purchase card products. Initial card purchase process 200 supports the selection of different card values and quantities of different purchase card products (task 204). FIG. 5 is a screen capture of an example purchase card ordering web page 500 that may be generated by purchase card system 100 in connection with initial card purchase process 200. Web page 500 enables the customer to initiate, via an e-commerce transaction, a request for a purchase card product having a stated value. As mentioned above, a purchase card product offered by purchase card system 100 preferably includes a product catalog identifier associated therewith, and purchase card system 100 preferably offers a plurality of purchase card products having different initial values. Thus, web page 500 may include a list 502 of the different purchase card products available for purchase, along with their respective product catalog identifiers and initial values. Web page 500 may also include quantity entry fields 504 that allow the customer to select card values and quantities for purchase. After selection of the purchase card products, the customer can activate an "order" button 506 to add the selected entries to the current e-commerce transaction.

Figure 6:
FIG. 6 is a screen capture of an example shopping cart web page that may be generated by a purchase card system according to the invention.

If the customer is ready for checkout (query task 206), then initial card purchase process 200 may display a checkout or shopping cart web page at customer computer device 104. In this regard, FIG. 6 is a screen capture of an example shopping cart web page 600 that may be generated by purchase card system 100 to facilitate completion of the online transaction. In this example, the customer has selected five purchase card products, each having an initial value of $2500, for a total price of $12500. Notably, each of the $2500 purchase card products may be identified by the same product catalog identifier "EXP2500." The line item entry for the purchase card products is identified by reference number 602. At checkout, the customer is prompted to select a method of payment for the purchase card products (task 208). In the example embodiment, the customer has the option to select a credit card, a purchase order, or (where a corporate contract is in place such as a Blanket Purchase Agreement) a record of call as a method of payment. After selecting the method of payment, the customer can then confirm the order to initiate completion of the transaction (task 210) at customer computer device 104. In response to the completion of the transaction, e-commerce server 110 may receive a suitably formatted request for the purchase card product. Notably, if the customer issues a purchase order for the purchase card product, then the funds are immediately obligated to the business entity offering the purchase card products.

In response to the completion of the transaction, the business entity components process the request in a suitable manner. For example, e-commerce application 122 and/or business management application 124 may be prompted to electronically process credit card information, purchase order information, or a combination thereof in connection with the sale of purchase card product. In connection with such processing, business management application 124 may create or update a deferred revenue account (task 212) to reflect the value of any purchase card products contained in the order. Such updating is important for compliance with certain accounting regulations and laws related to revenue recognition and reporting requirements. In addition, e-commerce application 122 and/or business management application 124 may initiate special processing and handling for purchase card products (task 214). For example, purchase card products are sold without imposing any sales taxes, and purchase card products are shipped to the customer without any associated freight or shipping charges.

E-commerce application 122 and/or business management application 124 may create a card record (or records) corresponding to any purchase card product contained in the customer's order. As described above, purchase card system 100 may store such card records in a suitably configured card record database 120, and a card record may include a number of data items related to the particular purchase card product. For example, initial card purchase process 200 may establish unique card numbers for each purchase card product contained in the customer's order (task 216). Process 200 may also establish and maintain card balances for each purchase card product contained in the order (task 218). For initial card purchases, the beginning card balance will equal the stated value and will equal the amount paid for the purchase card product. In accordance with one practical embodiment of the invention, the customer is able to identify each purchase card product by a nickname, a contract number, a government funding source identifier, or other card identifier that is stored with the card records. Thus, process 200 may also create or update a card identifier database (task 220) to reflect such card identifiers.

In the example embodiment of the invention, the purchase card product balance is immediately available to the customer upon processing of the order. Consequently, initial card purchase process 200 initiates linking of new card numbers to the respective online user account profile to establish the new purchase card balances as a payment option for subsequent product purchases (task 222). In practice, the next time the customer logs into his or her online account, the purchase card balances will be displayed as an optional method of payment in connection with a checkout web page (described in more detail below).

In connection with the completion of the initial purchase transaction, e-commerce application 122 may generate a suitable confirmation web page for display at customer computer device 104 (task 224). The confirmation web page may contain a purchase order number, an invoice number, and other information. In accordance with one practical embodiment of the invention, the confirmation web page also contains the purchase card numbers for any purchase card product contained in the customer's order. In addition, the confirmation web page may inform the customer that the purchase card product is being shipped and that the stated value of the card is now available for use in connection with the customer's online account profile. Alternatively or additionally, email server 108 can send a confirmation email to one or more email addresses associated with the customer's online account profile (task 224). The confirmation email includes the purchase card numbers for any purchase card products contained in the customer's order. In this manner, the delivery of the card numbers can be accomplished in a relatively secure and immediate fashion and the actual tangible purchase card products need not actually bear the respective card numbers.

Finally, initial card purchase process 200 initiates shipping of the purchase card product and a suitable reconciliation document to the purchaser (task 226). In practice, inventory, packing, and shipping systems 114 may perform some or all of the processing associated with task 226. The actual shipping address may correspond to any authorized "ship-to" address for any person, business, or other entity contained in the customer's online account profile. As mentioned above, the reconciliation document serves as a means for facilitating procurement system intake procedures by the recipient.

Figure 7:
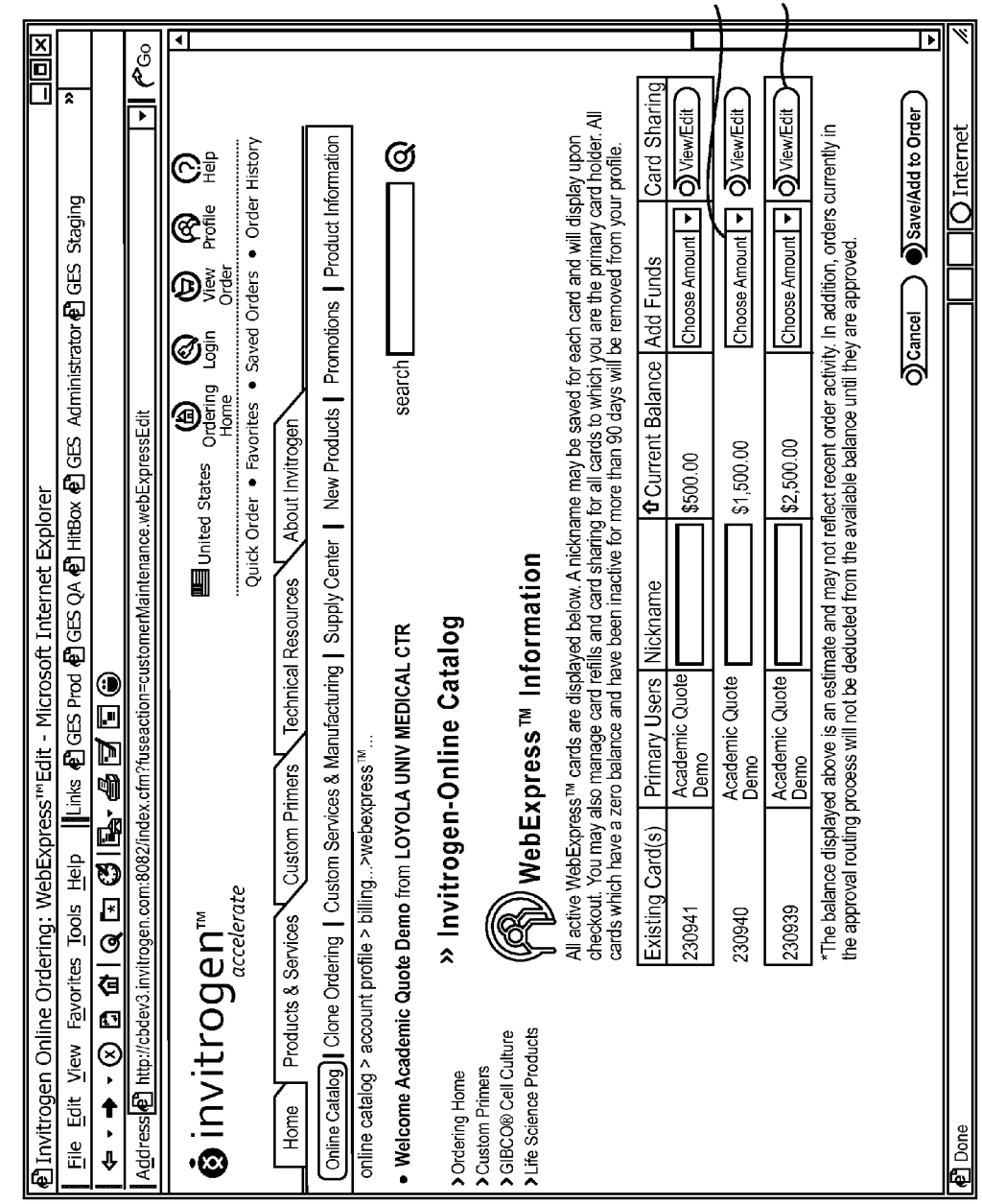
FIG. 7 is a screen capture of an example purchase card maintenance web page that may be generated by a purchase card system according to the invention.

E-commerce application 122 is preferably configured to provide status and maintenance information related to a user's purchase card products and balances. In this regard, FIG. 7 is a screen capture of a purchase card maintenance web page 700 that may be generated by purchase card system 100 for display at customer computer device 104. Web page 700 preferably includes a listing of all purchase card products for the primary user. In this example, each purchase card product is identified by its card number, and web page 700 includes the following information corresponding to each card number: the identity of the primary user or an associated entity; a card nickname; and a current balance. Of course, other data or information may be displayed in a practical embodiment. Web page 700 also includes a drop down menu feature 702 that allows the primary user to replenish or add funds to any of the listed purchase card products. In addition, as described in more detail below, web page 700 may include a link or button 704 for each listed purchase card product to facilitate card balance sharing with secondary users.

Figure 8:
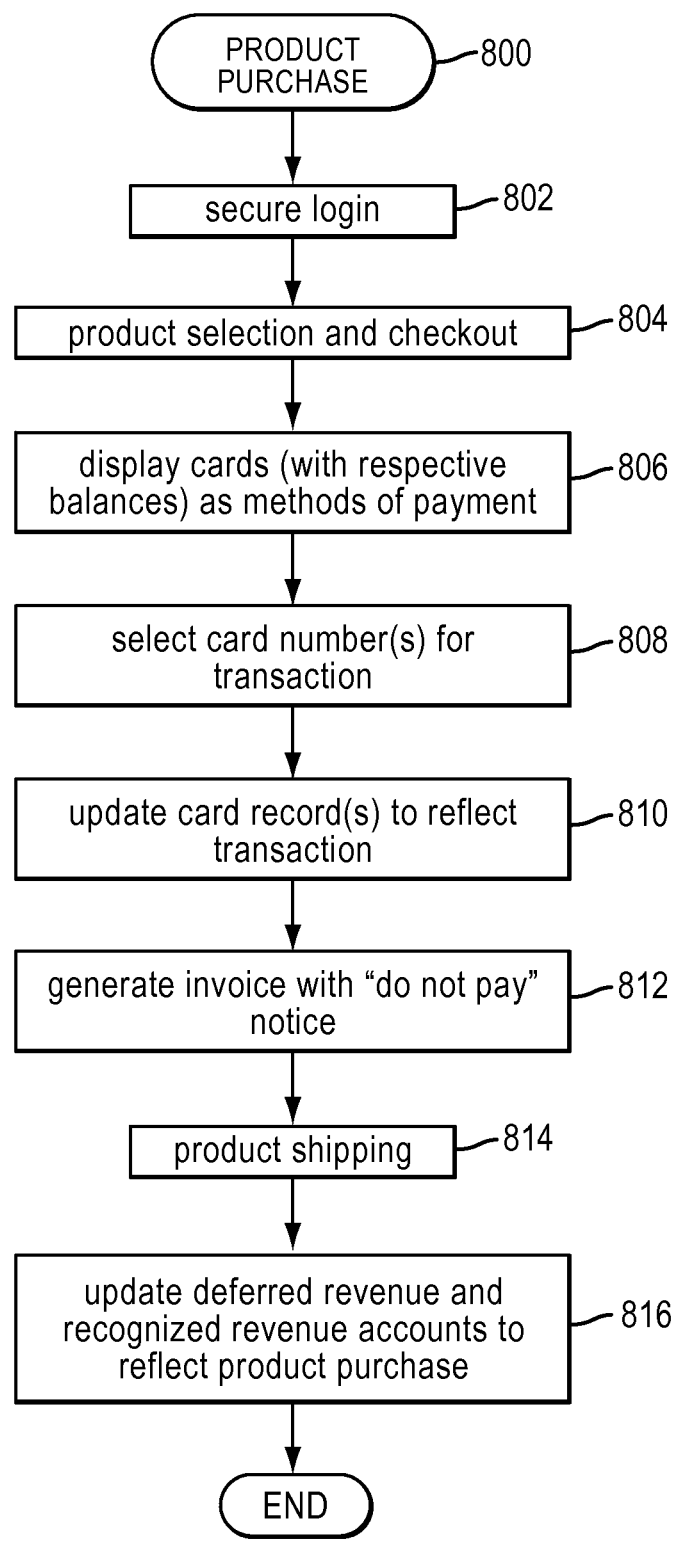
FIG. 8 is a flow diagram of a product purchase process according to an example embodiment of the invention.

Subsequent Product Purchase—FIG. 8 is a flow diagram of a product purchase process 800 according to an example embodiment of the invention. Process 800 assumes that the primary user has already obtained a purchase card product having an active purchase card balance. Process 800 may be performed to facilitate processing, via an e-commerce transaction, a product purchase for the user account. The various tasks performed in connection with process 800 may be performed by software, hardware, firmware, or any combination thereof. For illustrative purposes, the following description of process 800 may refer to elements mentioned above in connection with FIG. 1. In practical embodiments, portions of process 800 may be performed by different elements of purchase card system 100, e.g., customer computer devices 104 or any of the business entity components. It should be appreciated that process 800 may include any number of additional or alternative tasks, the tasks shown in FIG. 8 need not be performed in the illustrated order, and process 800 may be incorporated into a more comprehensive procedure or process having additional functionality not described in detail herein.

Figure 9:
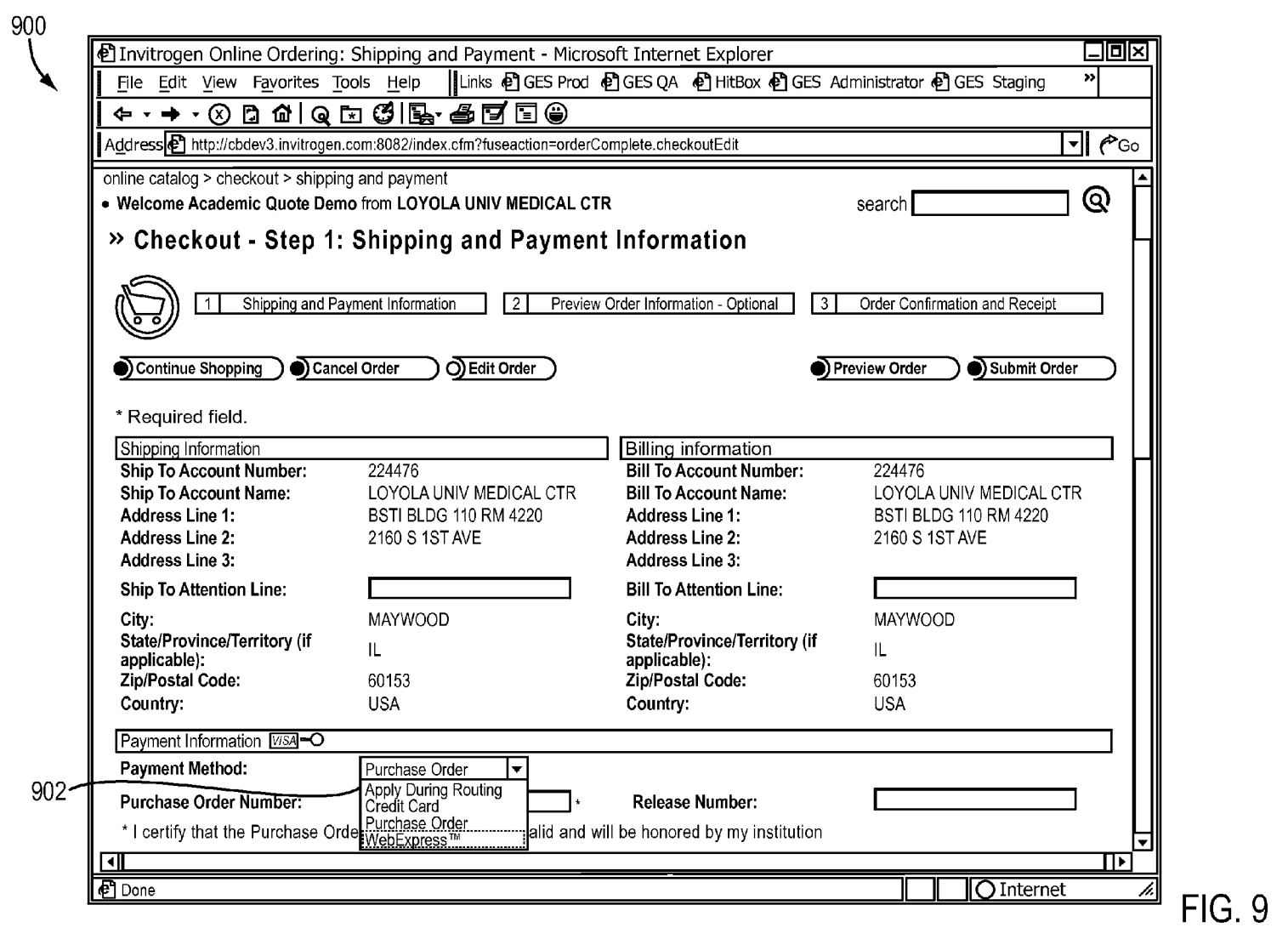

Product purchase process 800 may begin by performing a secure login procedure (task 802) to access the customer's online account or profile. A typical login procedure was described above in connection with initial card purchase process 200 and web page 400. In accordance with conventional e-commerce methodologies, the customer can select products online and initiate an online checkout procedure to complete the transaction (task 804). In a practical embodiment of the invention, process 800 generates a suitable checkout web page that is capable of displaying purchase card products, along with their respective card balances, as methods of payment for the currently selected products (task 806). In this regard, FIG. 9 is a screen capture of an example checkout web page 900 that may be generated by purchase card system 100 for display at customer computer device 104. In this example, checkout web page 900 includes a drop down feature 902 that allows the customer to select a method of payment for the current transaction. Notably, drop down feature 902 includes a purchase card option (identified by the term WEBEXPRESS™ in FIG. 9) along with traditional payment options such as credit card or purchase order. In practice, if the customer selects the purchase card option, process 800 may generate a new web page that lists the purchase card balances available to the customer (similar to web page 700 depicted in FIG. 7). This web page may receive a purchase card balance selection that identifies a given purchase card balance from the list of available balances. Alternatively, the web page may receive a purchase card number selection that identifies a particular card balance for the current transaction (task 808).

Assuming that the selected card balance is sufficient to cover the price of the selected products, then product purchase process 800 applies the selected balance toward the purchase price to reflect the current transaction. Otherwise, process 800 may generate a notification that reminds the customer to either replenish the selected card balance, select a new method of payment, or terminate the transaction. Of course, depending upon the specific implementation of purchase card system 100, a customer may be able to combine different methods of payment (e.g., credit card and purchase card) and/or multiple purchase card balances as payment toward a single product order. In the practical embodiment of the invention, the purchase card balance can be applied to the purchase without requiring a new purchase order or record of call for the purchased product. Once the purchase card funds are applied toward the purchase, process 800 initiates updating of the respective card record to reflect the transaction (task 810). Task 810 preferably includes reducing the respective purchase card balance by the purchase price (or a portion of the purchase price as applicable) and linking a suitable record to the card number to facilitate online access to order history corresponding to the card number.

Product purchase process 800 may control the generation of an invoice or other reconciliation document for shipment with the purchased product or for separate shipment or delivery to the customer (task 812). In practice, the invoice is printed with a "do not pay" notice to remind the customer that a purchase card balance was applied to the order. In accordance with conventional order handling methodologies, process 800 initiates product shipping (task 814) to one or more authorized "ship-to" addresses associated with the online account profile.

Upon completion of the order, product purchase process 800 may initiate certain accounting activity. For example, process 800 may initiate the updating of one or more deferred revenue accounts and one or more recognized revenue accounts to reflect the product purchase (task 816). As described above, unspent purchase card funds are treated as deferred revenue, while purchase card funds spent on product are treated as realized revenue. Following task 816, process 800 ends.

Figure 10:
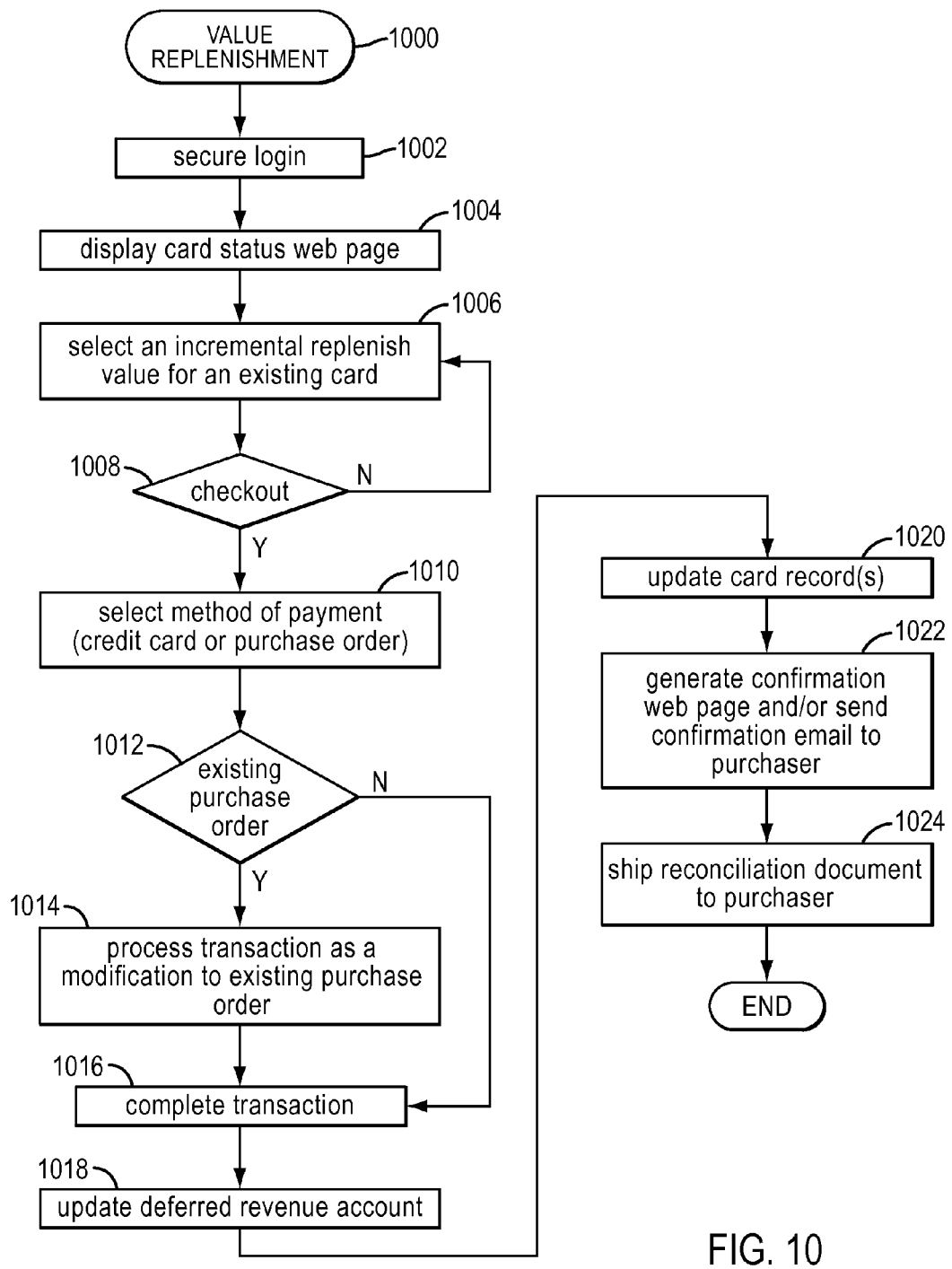
FIG. 10 is a flow diagram of a value replenishment process according to an example embodiment of the invention.

Card Balance Replenishment—FIG. 10 is a flow diagram of a value replenishment process 1000 according to an example embodiment of the invention. Process 1000 assumes that the primary user has already obtained a purchase card product having an active purchase card balance. Process 1000 may be performed to handle a replenish request for a purchase card product. The various tasks performed in connection with process 1000 may be performed by software, hardware, firmware, or any combination thereof. For illustrative purposes, the following description of process 1000 may refer to elements mentioned above in connection with FIG. 1. In practical embodiments, portions of process 1000 may be performed by different elements of purchase card system 100, e.g., customer computer devices 104 or any of the business entity components. It should be appreciated that process 1000 may include any number of additional or alternative tasks, the tasks shown in FIG. 10 need not be performed in the illustrated order, and process 1000 may be incorporated into a more comprehensive procedure or process having additional functionality not described in detail herein.

Value replenishment process 1000 may begin by performing a secure login procedure (task 1002) to access the customer's online account or profile. A typical login procedure was described above in connection with initial card purchase process 200 and web page 400. The customer may be prompted, via suitable web pages, to access a purchase card maintenance web page, such as web page 700, that displays the user's purchase card products and current balances (task 1004). As mentioned above, web page 700 preferably includes a drop down menu feature 702 that allows the user to select an incremental replenish value for any of the existing purchase card products (task 1006). Again, each incremental replenish value preferably has a unique product catalog identifier or SKU associated therewith. In the example embodiment, the replenish values are identical to the initial values offered by purchase card system 100. Web page 700 is suitably configured to enable the customer to replenish any number of the available card balances using a single transaction.

If the customer is ready for checkout (query task 1008), then value replenishment process 1000 may display a checkout or shopping cart web page at customer computer device 104. At checkout, the customer is prompted to select a method of payment for the card replenishment values and, if applicable, other products available via e-commerce application 122 (task 1010). In the example embodiment, the customer has the option to select a credit card or a purchase order number. In the preferred embodiment of the invention, purchase card system 100 allows a primary user to modify an existing purchase order as a method of payment for card replenishments (in lieu of completing a new purchase order). Thus, if the customer selects an existing purchase order (query task 1012), then purchase card system 100 can process the transaction as a modification to the existing purchase order (task 1014). Otherwise, purchase card system 100 can complete the transaction (task 1016) in a manner similar to that described above in connection with initial card purchase process 200.

In connection with the filling of replenishment orders, business management application 124 may update the deferred revenue account (task 1018) to reflect the stated value of any purchase card replenishments contained in the order. In addition, e-commerce application 122 and/or business management application 124 may initiate updating of the respective card records to reflect the replenishment value (task 1020). Task 1020 preferably includes increasing the respective purchase card balances for the user account in the amount of the stated replenish values. In connection with the completion of the replenishment transaction, purchase card system 100 may generate a suitable confirmation web page and/or send a confirmation email to the customer (task 1022). The confirmation may contain a purchase order number, an invoice number, and other information. In accordance with one practical embodiment of the invention, the confirmation also contains the purchase card numbers for any purchase card product replenished in the customer's order. In addition, the confirmation may inform the customer that the replenished value of the card is now available for use in connection with the customer's online account profile. Finally, value replenishment process 1000 initiates shipping of a suitable reconciliation document to the purchaser (task 1024). In practice, inventory, packing, and shipping systems 114 may perform some or all of the processing associated with task 1024. The actual shipping address may correspond to any authorized "ship-to" address for any person, business, or other entity contained in the customer's online account profile. As mentioned above, the reconciliation document serves as a means for facilitating procurement system intake procedures by the recipient. Following task 1024, process 1000 ends.

Figure 11:
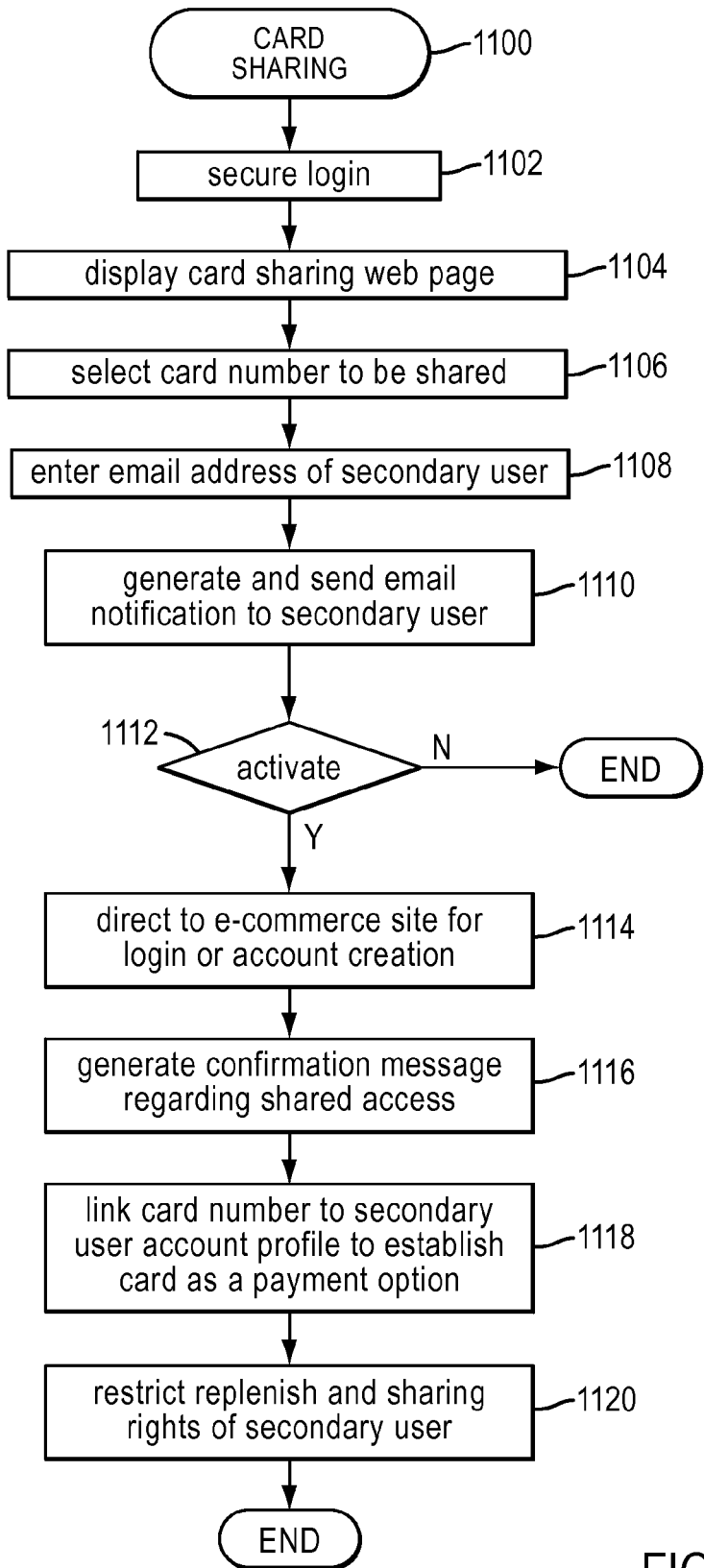
FIG. 11 is a flow diagram of a card sharing process according to an example embodiment of the invention.

Card Sharing Procedures—FIG. 11 is a flow diagram of a card sharing process 1100 according to an example embodiment of the invention. Process 1100 assumes that the primary user has already obtained a purchase card product having an active purchase card balance. Process 1100 may be performed to process a share request for a primary user's purchase card product, where the share request identifies a secondary user and initiates a link between the respective purchase card product and a secondary user account corresponding to the secondary user. The various tasks performed in connection with process 1100 may be performed by software, hardware, firmware, or any combination thereof. For illustrative purposes, the following description of process 1100 may refer to elements mentioned above in connection with FIG. 1. In practical embodiments, portions of process 1100 may be performed by different elements of purchase card system 100, e.g., customer computer devices 104 or any of the business entity components. It should be appreciated that process 1100 may include any number of additional or alternative tasks, the tasks shown in FIG. 11 need not be performed in the illustrated order, and process 1100 may be incorporated into a more comprehensive procedure or process having additional functionality not described in detail herein.

Figure 12:
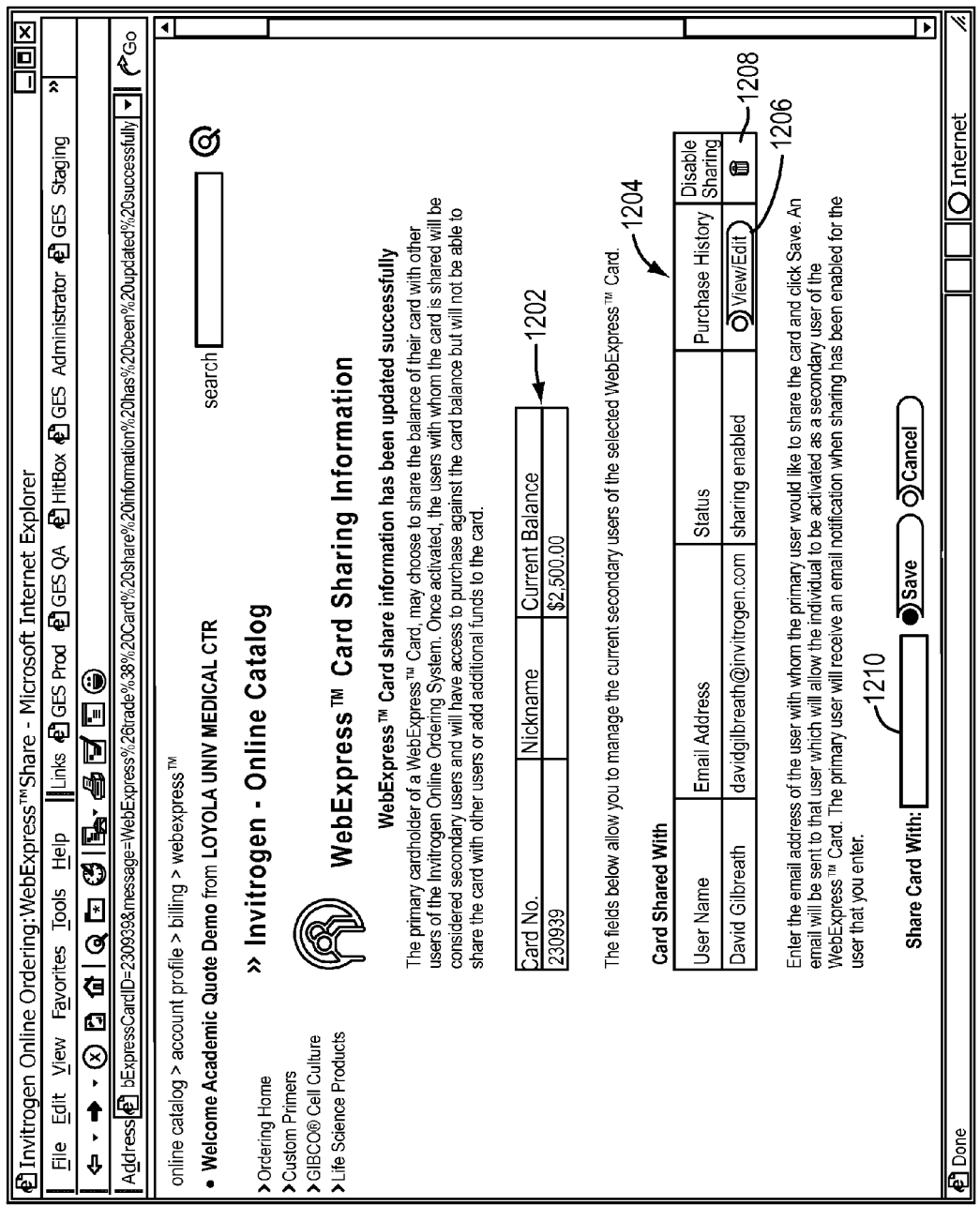
FIG. 12 is a screen capture of an example card sharing web page that may be generated by a purchase card system according to the invention.

Card sharing process 1100 may begin by performing a secure login procedure (task 1102) to access the customer's online account or profile. A typical login procedure was described above in connection with initial card purchase process 200 and web page 400. The customer may be prompted, via suitable web pages, to access a card sharing web page that displays sharing information for the primary user's purchase card products and current balances (task 1104). In this regard, FIG. 12 is a screen capture of an example card sharing web page 1200 that may be generated by purchase card system 100 for display at customer computer device 104. Web page 1200 includes a purchase card status field 1202, which may include the card number, nickname, and current balance of the primary user's purchase card product. Although web page 1200 depicts only one purchase card associated with the primary user, any number of different purchase cards may be listed. Web page 1200 may also include a current share status field 1204, which may identify a secondary user by user name and/or email address. Current share status field 1204 may also include the status associated with the secondary user, e.g., "sharing enabled" or "sharing disabled," an active link or button 1206 that enables the primary user to view and/or edit the purchase history of the secondary user, and an active enable/disable link or button 1208 that enables the primary user to enable or disable account sharing rights for the identified secondary user. Although web page 1200 depicts sharing with only one secondary user, purchase card system 100 is suitably configured to support sharing with any number of secondary users.

Card sharing process 1100 preferably allows the primary user to select a card number to be shared (task 1106). In this regard, web page 1200 may represent a web page generated in response to the selection of a specific card number. To initiate the sharing process, the primary user enters an email address for the secondary user (task 1108). Web page 1200 includes a data entry field 1210 that accommodates the entry of the secondary user's email address. In this manner, the share request identifies the secondary user by the email address. In the example embodiment of the invention, e-commerce application 122 initiates the generation and sending of an appropriate email notification or invitation by email server 108 to the secondary user (task 1110). The email may include instructions prompting activation of the share request by the secondary user. In a practical implementation, the email contains an active link or element that initiates the activation procedure.

If the secondary user clicks the active link or otherwise agrees to the activation of the card sharing feature, then card sharing process 1100 may initiate the generation of an activation web page that directs the secondary user to the appropriate e-commerce site maintained by e-commerce application 122 (task 1114). To prevent unintentional sharing, the active link may be disabled once the secondary user accesses e-commerce application 122. E-commerce application 122 may then initiate a login (or online account creation) procedure for the secondary user to facilitate secured activation of the card sharing feature. If the secondary user already has an online profile with e-commerce application 122, then the existing username and password can be used to access the activation web pages. At the activation web page, the secondary user may be prompted to accept the invitation to share the purchase card balance. Acceptance of the invitation may result in the generation of an activation request by customer computer device 104, where e-commerce application 122 processes the activation request. In response to the activation request, process 1100 may generate a suitable confirmation message regarding the updated share status and secondary user access to the purchase card balance (task 1116). For example, process 1100 may generate a confirmation web page for the secondary user, generate and send a confirmation email to the secondary user, and generate and send a confirmation email to the primary user.

To complete the share activation, card sharing process 1100 links the purchase card balance and/or the purchase card number to the secondary user account profile to establish the shared balance as a payment option for the secondary user (task 1118). Process 1100 may also update data maintained in sharing database 118 and card record database 120. Furthermore, card sharing web page 1200 will be updated for the primary user to reflect the enabling of the shared balance with the invited secondary user. Such updating of web page 1200 may occur at the next login by the primary user or when the primary user refreshes web page 1200.

In accordance with the preferred practical embodiment of the invention, purchase card system 100 restricts the replenish and sharing rights of secondary users (task 1120). These restrictions enable the primary user to maintain control over the shared access to the card balances and prevents misuse of shared funds. For example, secondary users are unable to purchase replenishments for a shared card balance, and secondary users are unable to further share any card balances maintained by primary users. In other words, secondary users are only able to make purchases with shared card balances. Following task 1120, card sharing process 1100 ends. Subsequent purchases made by secondary users are processed as described above in connection with product purchase process 800.

In summary, a purchase card system according to the invention, while not limited to any particular customer base, is particularly suitable for a business entity having a customer base that includes government and/or academic purchasers who are governed by certain ethical, legal, administrative, or regulatory rules and guidelines. Procurement and use of a purchase card product as described herein complies with mandated procurement, spending, and appropriations rules, regulations, and laws, which may be common in a grant funded research environment. Consequently, a purchase card system according to the invention is desirable for use in connection with the sale of life sciences research products and/or services to all life sciences researchers, including government and academic researchers. Systems, devices, and methods configured in accordance with example embodiments of the invention relate to:

A method for facilitating purchase card product transactions for a government or academic user account in compliance with mandated procurement, spending, and appropriations rules, regulations, and laws, the method comprising: receiving, via an e-commerce transaction, a request for a purchase card product having a stated value, the purchase card product having a product catalog identifier associated therewith; electronically processing credit card information, purchase order information, or a combination thereof, as a method of payment for the purchase card product; and establishing a purchase card balance for the user account in the amount of the stated value. The method may further comprise initiating shipment of the purchase card product and a corresponding reconciliation document to an entity associated with the user account, the reconciliation document facilitating procurement system intake procedures by the entity. The method may further comprise: offering life sciences research products and services for purchase via the e-commerce transaction; and processing, via a subsequent e-commerce transaction, a product purchase for the life sciences research products and services. In one embodiment, establishing a purchase card balance occurs in a fiscal year of a government or academic institution associated with the government or academic user account; and processing the product purchase occurs in a subsequent fiscal year of the government or academic institution. The method may further comprise establishing a maximum value for the stated value, the maximum value qualifying as a "micro-purchase" as defined by the Federal Acquisition Regulation. The method may further comprise creating a card record for the purchase card product, the card record including a government funding source identifier. The method may further comprise offering a plurality of stated values for the purchase card product, each of the plurality of stated values having a different product catalog identifier associated therewith. The method may further comprise: processing, via a subsequent e-commerce transaction, a product purchase for the user account, the product purchase having a purchase price; applying the purchase card balance toward the purchase price without requiring a new purchase order or record of call for the product purchase; and reducing the purchase card balance by the purchase price. The method may further comprise: generating a web page containing a listing of a plurality of available purchase card balances for the user account; and receiving a purchase card balance selection that identifies the purchase card balance from the plurality of available purchase card balances. The method may further comprise automatically linking the user account to user-specific pricing for the product purchase, the automatically linking step being performed prior to the processing step. The method may further comprise: receiving, via a subsequent e-commerce transaction, a replenish request for the purchase card product, the replenish request corresponding to a stated replenish value, the stated replenish value having a replenish product catalog identifier associated therewith; and increasing the purchase card balance for the user account in the amount of the stated replenish value. The method may further comprise modifying an existing purchase order to reflect payment for the stated replenish value. The method may further comprise establishing a maximum replenish value for the stated replenish value, the maximum replenish value qualifying as a "micro-purchase" as defined by the Federal Acquisition Regulation. The method may further comprise offering a plurality of stated replenish values for the purchase card product, each of the plurality of stated replenish values having a different replenish product catalog identifier associated therewith. The method may further comprise: receiving a share request for the purchase card product, the share request identifying a secondary user; and linking the purchase card balance to a secondary user account corresponding to the secondary user. The method may further comprising restricting, for the secondary user account, rights to share and replenish the purchase card balance. The method may further comprise: the share request identifying the secondary user by an email address of the secondary user; and sending, via the email address, an email invitation to the secondary user, the email invitation prompting activation of the share request by the secondary user. The method may further comprise: receiving an activation request in response to sending the email invitation; and the linking step being performed in response to the activation request.

A method for facilitating purchase card transactions for a user account, the method comprising: offering an e-commerce purchase card for life sciences research products and services, the e-commerce purchase card having a stated value; maintaining a purchase card balance for the user account; and applying, via a subsequent e-commerce transaction for life sciences research products or services having a purchase price, the purchase card balance toward the purchase price; wherein offering the e-commerce purchase card and the subsequent e-commerce transaction are in compliance with mandated procurement, spending, and appropriations rules, regulations, and laws. The applying step may comprise applying the purchase card balance toward the purchase price without requiring a purchase order or a record of call for the life science research products or services. The method may further comprise initiating shipment of the e-commerce purchase card and a corresponding reconciliation document to an entity associated with the user account, the reconciliation document facilitating procurement system intake procedures by the entity. The method may further comprise establishing a maximum value for the stated value, the maximum value qualifying as a "micro-purchase" as defined by the Federal Acquisition Regulation. The method may further comprise establishing list pricing for the e-commerce purchase card, the list pricing qualifying as "fair and reasonable" as defined by the Anti-Deficiency Act. The method may further comprise: receiving, via a subsequent e-commerce transaction, a replenish request for the e-commerce purchase card, the replenish request corresponding to a stated replenish value; and increasing the purchase card balance for the user account in the amount of the stated replenish value. The method may further comprise modifying an existing purchase order to reflect payment for the stated replenish value. The method may further comprise establishing a maximum replenish value for the stated replenish value, the maximum replenish value qualifying as a "micro-purchase" as defined by the Federal Acquisition Regulation. In one embodiment, maintaining a purchase card balance occurs in a fiscal year of a government or academic institution associated with the user account; and the subsequent e-commerce transaction occurs in a subsequent fiscal year of the government or academic institution.

A method for facilitating purchase card transactions for life sciences research products and services in compliance with mandated procurement, spending, and appropriations rules, regulations, and laws, the method comprising: ordering, via an e-commerce transaction for a user account, a purchase card product having a stated value, the stated value qualifying as a "micro-purchase" as defined by the Federal Acquisition Regulation; purchasing, via a subsequent e-commerce transaction, life sciences research product or services for the user account, the life sciences research product or services having a purchase price; and selecting the purchase card product as a method of payment toward the purchase price without requesting a purchase order or a record of call for the life sciences research product or services. The method may further comprise ordering, via a second subsequent e-commerce transaction, a replenish value for the purchase card product, the replenish value having a stated value, the stated value qualifying as a "micro-purchase" as defined by the Federal Acquisition Regulation. The method may further comprise modifying an existing purchase order to reflect payment for the replenish value. The method may further comprise completing a share request for the purchase card product, the share request identifying a secondary user, and the share request initiating a link between the purchase card product and a secondary user account corresponding to the secondary user. In one embodiment, ordering the purchase card product occurs in a fiscal year of a government or academic institution associated with the user account; and purchasing the life sciences research product or services occurs in a subsequent fiscal year of the government or academic institution.

An e-commerce system for life sciences research products and services, the e-commerce system comprising: an e-commerce engine configured to generate web pages to facilitate online purchases of life sciences research products and services for user accounts, and to facilitate online purchases of purchase card products for user accounts; an inventory system for life sciences research products and services and purchase card products available for purchase via the e-commerce engine; and a purchase card balance database coupled to the e-commerce engine and configured to maintain purchase card balances corresponding to purchase card products for at least some of the user accounts; the e-commerce engine being further configured to process, via an e-commerce transaction, a life sciences research product or services purchase for a user account, the life sciences research product or services purchase having a purchase price, and to apply a purchase card balance for the user account toward the purchase price without requiring a purchase order or a record of call for the life sciences research product or services purchase. In one practical embodiment, the life sciences research product or services purchase is in compliance with mandated procurement, spending, and appropriations rules, regulations, and laws. The e-commerce engine may be further configured to offer for purchase a plurality of purchase card products having different initial stated values, up to a maximum stated value that qualifies as a "micro-purchase" as defined by the Federal Acquisition Regulation. The e-commerce system may further comprise a product catalog identifier database coupled to the e-commerce engine, each of the plurality of purchase card products having a different product catalog identifier associated therewith and maintained in the product catalog identifier database. The e-commerce engine may be further configured to offer for purchase a plurality of purchase card replenishment products having different stated replenish values, up to a maximum stated replenish value that qualifies as a "micro-purchase" as defined by the Federal Acquisition Regulation. The e-commerce system may further comprise a product catalog identifier database coupled to the e-commerce engine, each of the plurality of purchase card replenishment products having a different product catalog identifier associated therewith and maintained in the product catalog identifier database.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A method for facilitating purchase card product transactions for a user account in compliance with procurement, spending, and appropriations rules, regulations, and laws applicable to the user account, said method comprising:

offering a plurality of purchase cards, wherein each of the plurality of purchase cards has a different monetary value and wherein each of the plurality of purchase cards is associated with a unique catalog identifier;

receiving, via an e-commerce transaction, a request for a purchase card product having a stated value, wherein the purchase card product value is replenishable;

electronically processing credit card information, purchase order information, or a combination thereof, as a method of payment for said purchase card product;

establishing a purchase card balance for said user account in the amount of said stated value, wherein the purchase card balance is linked to a government funding source for funding scientific research;

using the purchase card product to purchase life science research products and services funded by research grants or other subsidized funding sources;

creating a card record for said purchase card product, said card record including a government funding source identifier; and returning to the user account any unused value.

2. A method according to claim 1, further comprising initiating shipment of said purchase card product to an entity associated with said user account.

3. A method according to claim 2, wherein the purchase card product is shipped with a corresponding reconciliation document, said reconciliation document facilitating procurement system intake procedures by said entity.

4. A method according to claim 1, wherein the method facilitates transactions of a government or academic user.

5. A method according to claim 1, further comprising: offering life sciences research products and services for purchase via said ecommerce transaction; and processing, via a subsequent e-commerce transaction, a product purchase for said life sciences research products and services.

6. A method according to claim 5, wherein: establishing a purchase card balance occurs in a fiscal year of a government or academic institution associated with the government or academic user account; and processing said product purchase occurs in a subsequent fiscal year of said government or academic institution.

7. A method according to claim 1, further comprising: processing, via a subsequent e-commerce transaction, a product purchase for said user account, said product purchase having a purchase price; applying said purchase card balance toward said purchase price without requiring a new purchase order or record of call for said product purchase; and reducing said purchase card balance by said purchase price.

8. A method according to claim 7, further comprising: generating a web page containing a listing of a plurality of available purchase card balances for said user account; and receiving a purchase card balance selection that identifies said purchase card balance from said plurality of available purchase card balances.

9. A method according to claim 7, further comprising automatically linking said user account to user-specific pricing for said product purchase, said automatically linking step being performed prior to said processing step.

10. A method according to claim 1, further comprising: receiving, via a subsequent e-commerce transaction, a replenish request for said purchase card product, said replenish request corresponding to a stated replenish value, said stated replenish value having a replenish product catalog identifier associated therewith; and increasing said purchase card balance for said user account in the amount of said stated replenish value.

11. A method according to claim 10, further comprising modifying an existing purchase order to reflect payment for said stated replenish value.

12. A method according to claim 10, further comprising offering a plurality of stated replenish values for said purchase card product, each of said plurality of stated replenish values having a different replenish product catalog identifier associated therewith.

13. A method according to claim 1, further comprising: receiving a share request for said purchase card product, said share request identifying a secondary user; and linking said purchase card balance to a secondary user account corresponding to said secondary user.

14. A method according to claim 13, further comprising restricting, for said secondary user account, rights to share and replenish said purchase card balance.

15. A method according to claim 13, further comprising: said share request identifying said secondary user by an email address of said secondary user; and sending, via said email address, an email invitation to said secondary user, said email invitation prompting activation of said share request by said secondary user.

16. A method according to claim 15, further comprising: receiving an activation request in response to sending said email invitation; and said linking step being performed in response to said activation request.

17. A method for facilitating purchase card transactions for a user account, said method comprising:

offering through an online website a plurality of purchase cards for life sciences research products and services available on the online website, wherein each of the plurality of purchase cards has a different monetary value and wherein each of the plurality of purchase cards is associated with a unique catalog identifier, and wherein the purchase card value is replenishable, and wherein the purchase card value is linked to a government funding source for funding scientific research;

maintaining a purchase card balance for said user account;

applying, via a subsequent e-commerce transaction for life sciences research products or services funded by research grants or other subsidized funding sources having a purchase price, said purchase card balance toward said purchase price, wherein offering said e-commerce purchase card and said subsequent e-commerce transaction are in compliance with procurement, spending, and appropriations rules, regulations, and laws applicable to the user account;

receiving, via a subsequent e-commerce transaction, a replenish request for said ecommerce purchase card, said replenish request corresponding to a stated replenish value;

increasing said purchase card balance for said user account in the amount of said stated replenish value;

modifying an existing purchase order to reflect payment for said stated replenish value; and optionally returning unused value.

18. A method according to claim 17, wherein said applying step comprises applying said purchase card balance toward said purchase price without requiring a purchase order or a record of call for said life science research products or services.

19. A method according to claim 17, further comprising electronically delivering a unique identification number to a user.

20. A method according to claim 17, further comprising initiating shipment of said e-commerce purchase card to an entity associated with said user account.

21. A method according to claim 20, wherein a corresponding reconciliation document is shipped to the entity along with the e-commerce purchase card, said reconciliation document facilitating procurement system intake procedures by said entity.

22. A method according to claim 17, wherein: maintaining a purchase card balance occurs in a fiscal year of a government or academic institution associated with the user account; and said subsequent e-commerce transaction occurs in a subsequent fiscal year of said government or academic institution.

23. A method according to claim 17, wherein said purchase card balance is maintained in real-time.

24. A method according to claim 23, wherein the purchase card balance is accessible in real-time to users of the user account.

25. A method according to claim 17, wherein the offering comprises offering life sciences research products and/or services other than oligonucleotides and/or their synthesis.

26. A method according to claim 17, wherein the offering comprises offering life sciences research products and services comprising oligonucleotides and/or their synthesis.

* * * * *